US006651799B1

(12) United States Patent
Rice et al.

(10) Patent No.: US 6,651,799 B1
(45) Date of Patent: Nov. 25, 2003

(54) MODULAR PALLET INDEXING CHASSIS FOR AUTOMATED MANUFACTURING AND ASSEMBLY OPERATIONS

(75) Inventors: Robert R. Rice, Mt. Juliet, TN (US); Lawrence David Weber, Mt. Juliet, TN (US); Douglas M. Alward, Mt. Juliet, TN (US)

(73) Assignee: Wright Industries Incorporated, Nashville, TN (US)

( * ) Notice: Subject to any disclaimer, the term of this patent is extended or adjusted under 35 U.S.C. 154(b) by 0 days.

(21) Appl. No.: 09/897,746

(22) Filed: Jul. 2, 2001

Related U.S. Application Data
(60) Provisional application No. 60/215,298, filed on Jun. 30, 2000.

(51) Int. Cl.[7] .............................................. B65G 47/00
(52) U.S. Cl. .................... 198/345.3; 198/465.1
(58) Field of Search ................... 198/345.3, 465.1; 414/222.06; 29/33 P, 563

(56) References Cited

U.S. PATENT DOCUMENTS

| | | | | |
|---|---|---|---|---|
| 3,315,778 A | * | 4/1967 | Kendall et al. | 198/345.3 |
| 4,475,642 A | * | 10/1984 | Fritz | 198/345.3 |
| 4,492,297 A | * | 1/1985 | Sticht | 198/345.3 |
| 4,519,491 A | * | 5/1985 | Prodel et al. | 198/465.1 |
| 4,762,218 A | * | 8/1988 | Sticht | 198/345.3 |
| 4,930,258 A | * | 6/1990 | Carlson | 198/345.1 |
| 5,237,736 A | * | 8/1993 | Inoue et al. | 29/33 P |

* cited by examiner

*Primary Examiner*—Joseph E. Valenza
(74) *Attorney, Agent, or Firm*—Mark J. Patterson; Phillip E. Walker

(57) ABSTRACT

A modular chassis for use in a manufacturing process line wherein manufacturing process steps are performed by manufacturing devices on workpieces carried by pallets. The chassis top plate is machined attaching one or more different types of manufacturing devices to the chassis, such as a robot or automatic parts feeder. A non-synchronous incoming pallet conveyor is aligned horizontally to receive a set of incoming pallets. A pallet transfer and index module is attached and aligned to accept the set of incoming pallets from the incoming pallet conveyor. The transfer and index module includes an indexing mechanism to accurately position each of the retrieved incoming pallets in one of a plurality of workstations so that at the end of the transfer cycle the process steps can be performed on each of the workpieces. An outgoing pallet conveyor is also aligned horizontally on the top plate to receive the set of pallets from the pallet transfer and index device and move the set of pallets to an outgoing side of the chassis at the end of the process cycle. A pallet return conveyor is aligned on the top plate parallel to the incoming and outgoing pallet conveyors proximate an operator side of the chassis. The chassis further includes at least one power and control sub-system for providing operational power to, and control of, one or more of the manufacturing devices that are attachable to the chassis, and a process control panel viewable from the operator side of the chassis.

12 Claims, 14 Drawing Sheets

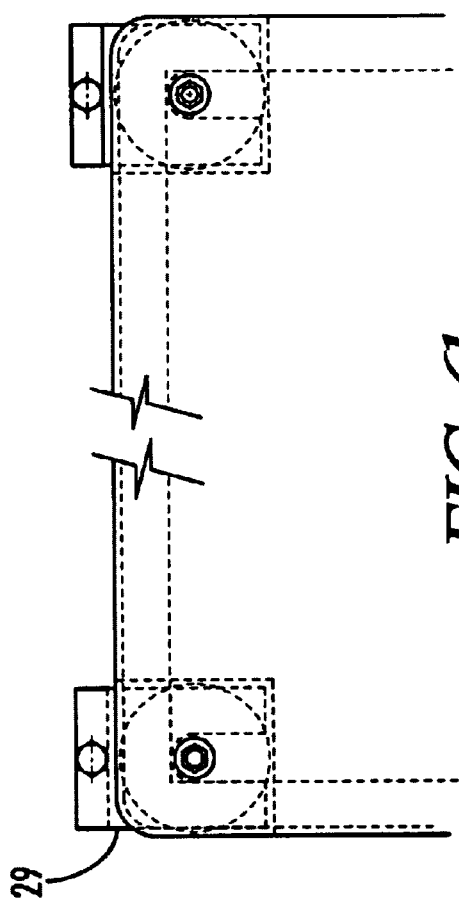
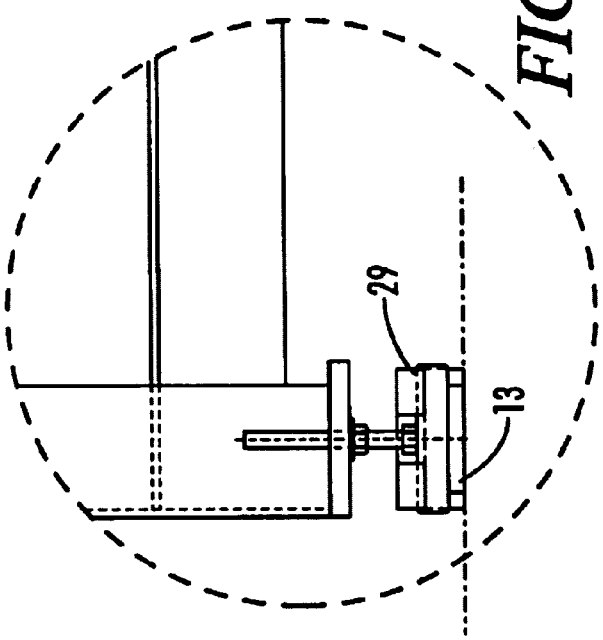
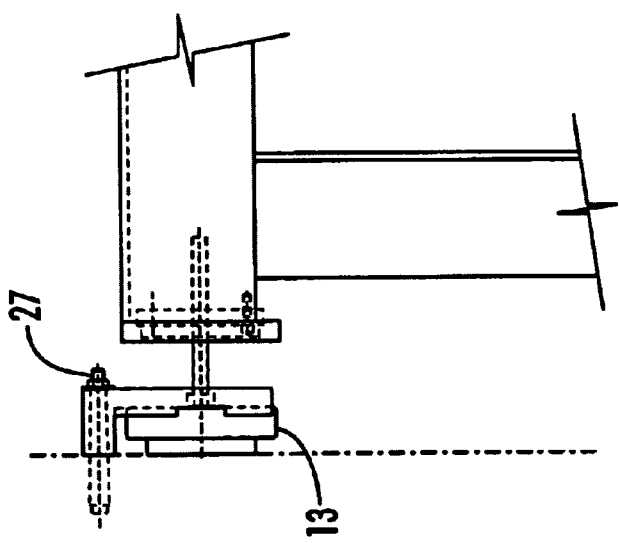
FIG. 6b
FIG. 6c
FIG. 6a

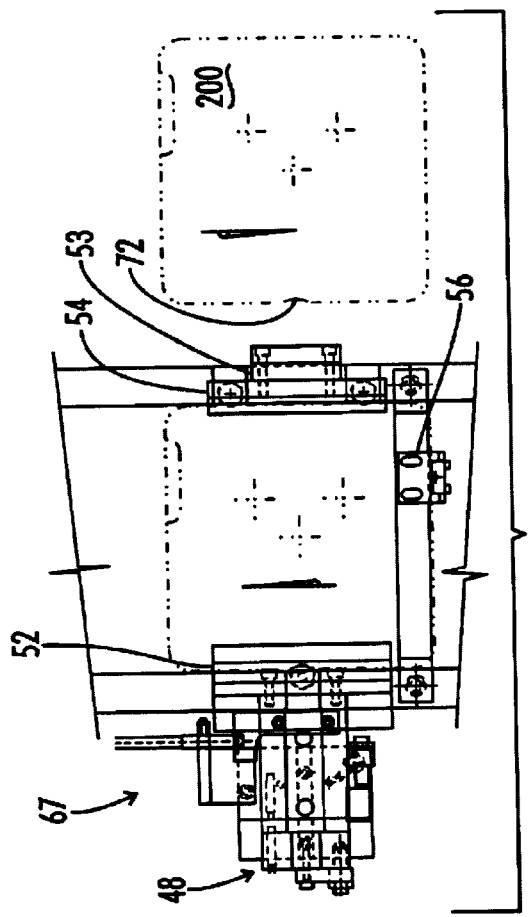
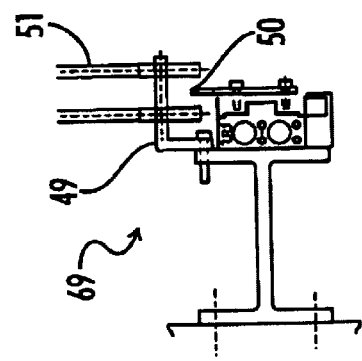
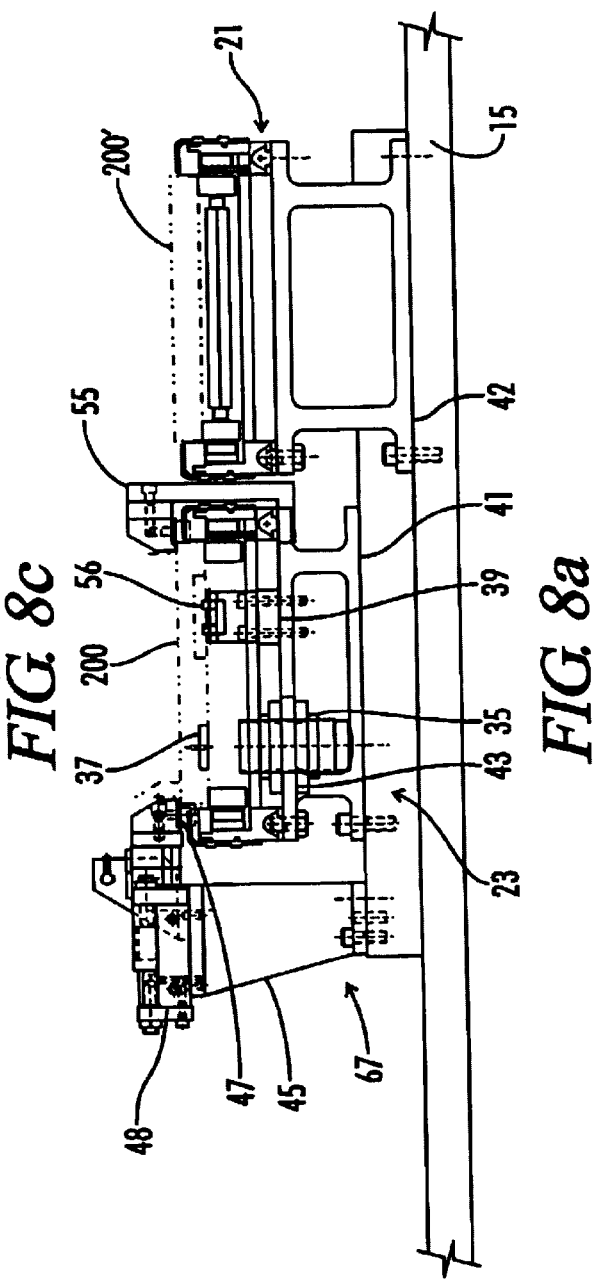
FIG. 8c
FIG. 8b
FIG. 8a

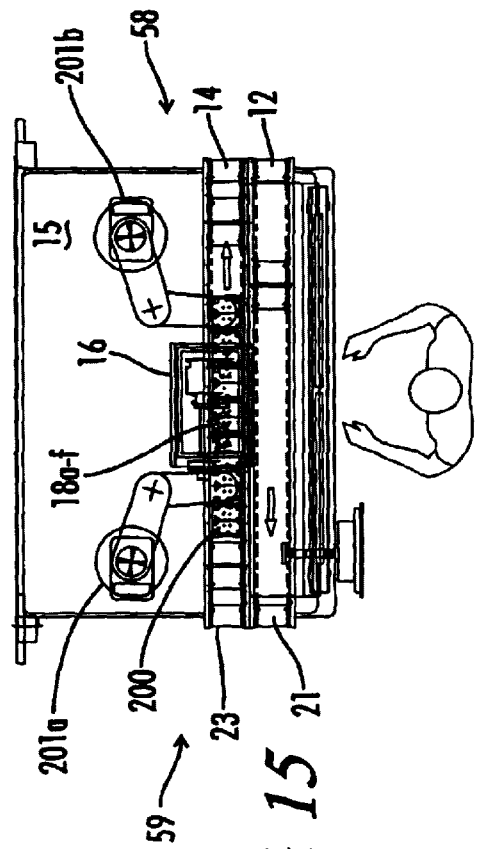
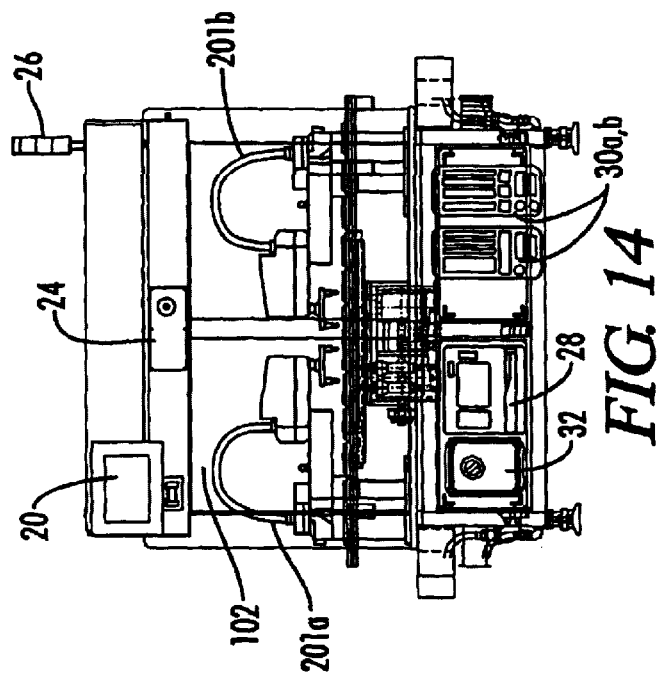
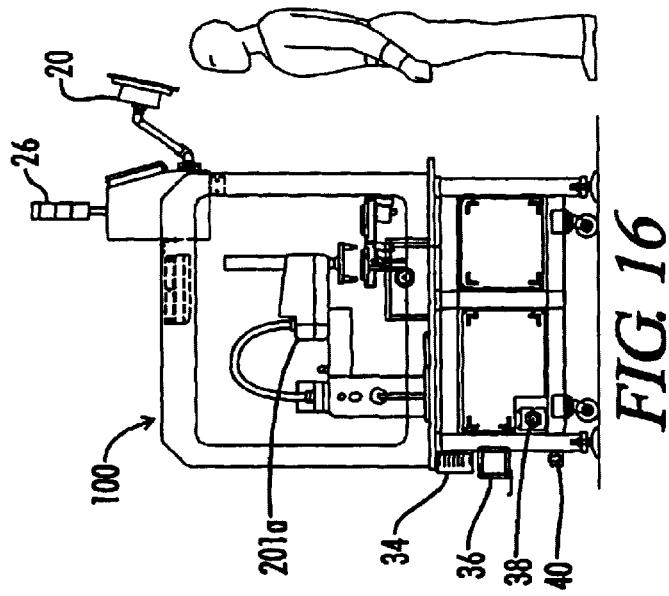

MODULAR PALLET INDEXING CHASSIS FOR AUTOMATED MANUFACTURING AND ASSEMBLY OPERATIONS

This application claims benefit of U.S. Provisional Patent Application No. 60/215,298, filed Jun. 30, 2000, for a "Modular Pallet Indexing Chassis", the disclosure of which is incorporated herein.

BACKGROUND OF THE INVENTION

The present invention relates generally to equipment used for automating repetitive product manufacturing and assembly operations. More specifically, thus invention pertains to a modular indexing chassis for use in a pallet-type manufacturing process line.

In high-speed manufacturing and assembly systems, parts or components (sometimes generally referred to as "workpieces") are typically transported along a conveyor-type assembly line by means of a small movable platform, known as a pallet. The pallet is stopped at various locations along the assembly line so that some type of assembly operation can be performed. In a typical assembly line installation, the pallets are placed on moving belts on a conveyor.

Conventional pallet conveyors in a manufacturing process line generally operate in either a synchronous or asynchronous mode. In synchronous systems, the conveyor is intermittently driven to move the pallets between workstations. The workpieces are transported by the pallets that ride on top of the conveyor. The workpiece and pallet proceed through each stage of the assembly process but do not move to the next workstation until all of the workpieces are also ready to proceed, i.e., each workpiece is synchronized with the other workpieces. Thus, in synchronous assembly systems, the conveyor stops after each workpiece arrives at its respective workstation and the stage or task that takes the greatest amount of time will limit the rate at which all other tasks or stages can be completed. Synchronous pallet conveyors can be relatively simple to make and use because the pallets are typically frictionally conveyed, no stop device is typically used, and the pallets are generally not disengaged from the conveyor at the workstations. However, the throughput speed of the conveyor line is limited to the throughput speed of the slowest workstation.

In non-synchronous assembly systems, the conveyor is continuously moving forward. Multiple slower tasks can be performed concurrently by employing combinations of divide modules or divide sections. At a divide section, pallets are diverted from the main conveyor to spur conveyors so that the slow task may be performed on a number of workpieces at the same time. Divide sections are designed to send workpieces with the slowest task completed down the conveyor at the line rate or the rate at which the main conveyor chain is moving. After a slower task is completed, the workpiece is routed back to the main conveyor via a merge module. A slower assembly task may also be performed by removing the workpiece and pallet from the conveyor, performing the task, and returning the workpiece and pallet to the conveyor for transport to the next workstation.

An important consideration in the speed and efficiency of a manufacturing process line using pallets, conveyors, and multiple workstations, is the need for modifying and adapting one or more workstations to perform different operations on different parts. Depending on the product being assembled, a specific workstation will employ one or more of a variety of different assembly devices, including parts pickers, parts feeders and robots. These assembly devices, in turn, require different support and control sub-systems located at or on the workstation chassis, including mechanical mounting systems, electrical controls, pneumatic valves and controls, and computer controls.

Preferably, a workstation chassis used in a pallet-type production line would be designed to support and control a variety of such assembly devices and to allow for rapid changeover to a different configuration without significant disruption of the production process. The chassis would be modular so that multiple chassis can be coupled together using non-synchronous pallet conveyors. The chassis would have its own pallet indexing device so that multiple pallets and workpieces can be accurately positioned at different workstations on the chassis for performing high-speed synchronous assembly operations. Unfortunately, there is no workstation chassis in the prior art that combines modularity, adaptability, speed and accuracy to create a high-speed production line

SUMMARY OF THE INVENTION

One object of the present invention is to provide a workstation chassis for a pallet-type automated production line that can be linked together in modular fashion using non-synchronous pallet conveyors.

Another object of the invention is to improve the ability to quickly adapt a workstation chassis to a support variety of different manufacturing process devices.

A further object of the invention is to include multiple workstations on single chassis so that synchronous operations can be accurately performed on multiple workpieces.

These and other objects are achieved by a modular chassis for use in a manufacturing process line wherein manufacturing process steps are performed by manufacturing devices on workpieces carried by pallets. The chassis base supports a horizontal top plate that is machined and tooled for mechanically attaching one or more different types of manufacturing devices to the chassis, such as a robot or automatic parts feeder. An incoming pallet conveyor is aligned horizontally on the top plate to receive a set of incoming pallets from an incoming side of the chassis.

A pallet transfer and indexing module is attached to the chassis proximate the incoming pallet conveyor and is aligned to accept the set of incoming pallets from the incoming pallet conveyor. The pallet transfer and indexing module includes an indexing mechanism to accurately position each of the retrieved incoming pallets in the set in one of a plurality of linearly aligned workstations during a transfer cycle so that at the end of the transfer cycle the process steps can be performed on each of the workpieces supported by each of the plurality of pallets in the set during a process cycle.

An outgoing pallet conveyor is also aligned horizontally on the top plate to receive the set of pallets from the pallet transfer and indexing device and move the set of pallets to an outgoing side of the chassis at the end of the process cycle. A pallet return conveyor is aligned on the top plate parallel to the incoming and outgoing pallet conveyors proximate an operator side of the chassis. Thus, the return conveyor is positioned to receive pallets from other stations on the outgoing side and move them to the incoming side for return to the process starting position.

The chassis further includes at least one power and control sub-system for providing operational power to, and control of, one or more of the manufacturing devices that are attachable to the chassis, and a process control panel viewable from the operator side of the chassis.

A chassis guard is attached to chassis to shield an operator from the manufacturing devices and transfer and indexing module during the transfer and process cycles.

In one embodiment, the modular chassis uses a six workstation indexing operation that allows a complete or partial process to be completed in a high-speed synchronous operation. Coupling multiple chassis together using a non-synchronous link (pallet conveyor) establishes an efficient but high-speed production system. A chassis can be removed from the process and replaced with another to alter the process, or to changeover to another product. A chassis can be re-tooled off line to avoid interference with production.

To provide improved adaptability, the chassis is equipped with electrical controls, pneumatic valves, and mounting holes to allow the user to quickly mount manufacturing devices such as robots or parts feeders for rapid deployment in production. A basic program in an industrial control computer allows easy adaptation to standard assembly or manufacturing operations.

For increased speed of operation, a cam driven indexer moves and locates the pallets a specific transfer distance in the minimum amount of time. A modified sine curve on the transfer cam allows the maximum speed for pallet transfer.

The pre-loaded cam drive accomplishes the pallet transfer in a repeatable accuracy of one thousandth of an inch every cycle. This allows very precise assembly operations to be performed in the pallet fixturing without removing the parts from the pallet.

BRIEF DESCRIPTION OF THE DRAWINGS

FIGS. 6a, b, and c are enlarged views of a portion (circle 6c on FIG. 2) of the modular pallet indexing chassis of the present invention.

FIG. 8(a) is sectional view (section 8a–8a from FIG. 1) of the modular pallet indexing chassis of the present invention, showing an enlarged side view of the pallet pre-stage mechanism.

FIG. 8(b) is an enlarged side view of the pallet position sensor assembly.

FIG. 8(c) is an enlarged plan view of the pre-stage mechanism shown in FIG. 8(a).

FIG. 14 is a front view of the modular pallet indexing chassis of the present invention as configured for use in a high-speed production system with a chassis guard installed.

FIG. 15 is a top view of the chassis configuration shown in FIG. 14.

FIG. 16 is a side view of the chassis configuration shown in FIGS. 14 and 15.

DESCRIPTION OF THE PREFERRED EMBODIMENTS

The modular indexing chassis 10 of this invention is shown in FIGS. 1–8 with no manufacturing devices attached and without a chassis guard. The chassis guard is shown in FIGS. 9–13. One embodiment of the chassis 10 is shown in FIGS. 14–16 configured with robots as manufacturing devices and a chassis guard.

Figure 3:
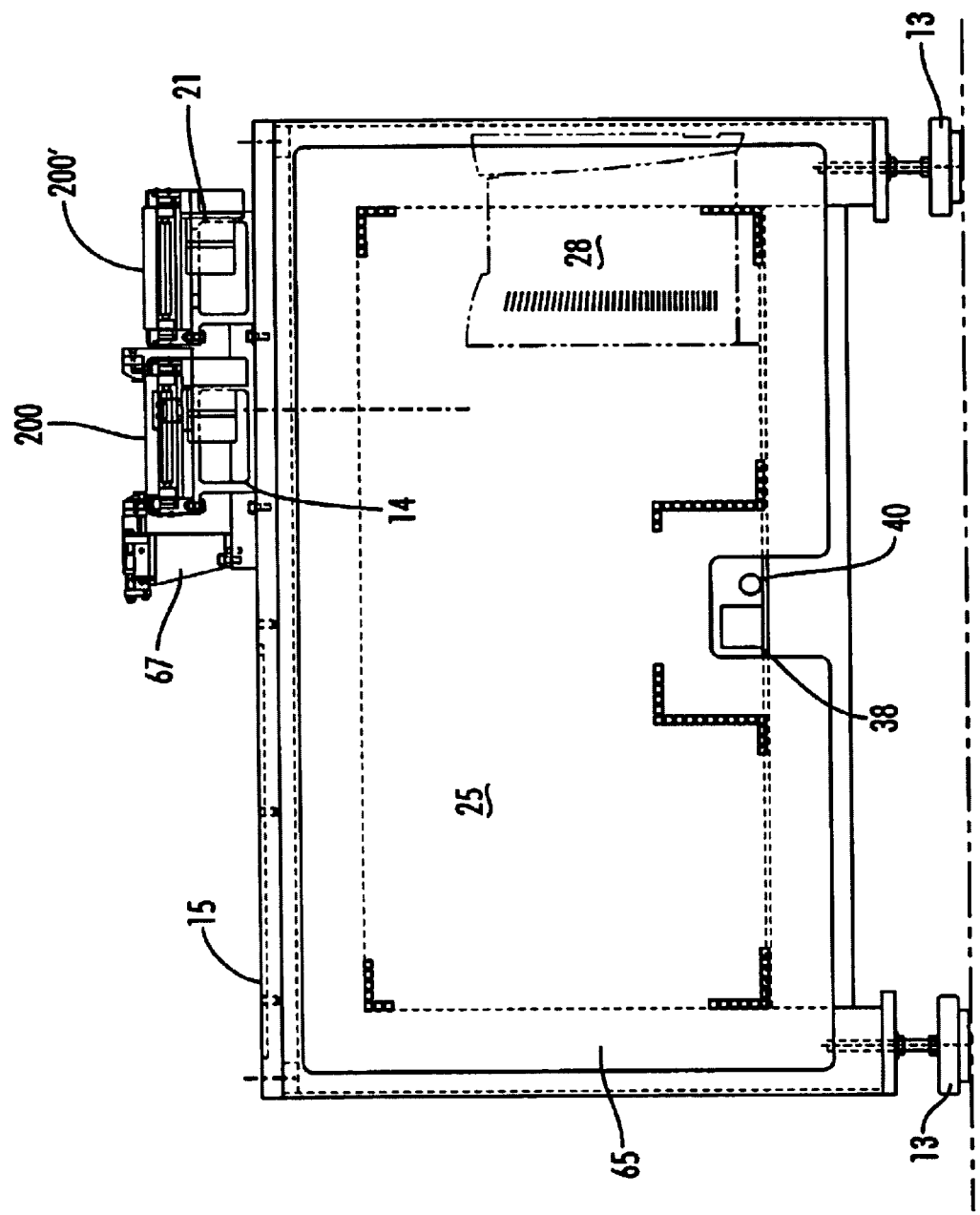
FIG. 3 is an end view (view 3 from FIG. 2) of the modular pallet indexing chassis of the present invention.
Figure 4:
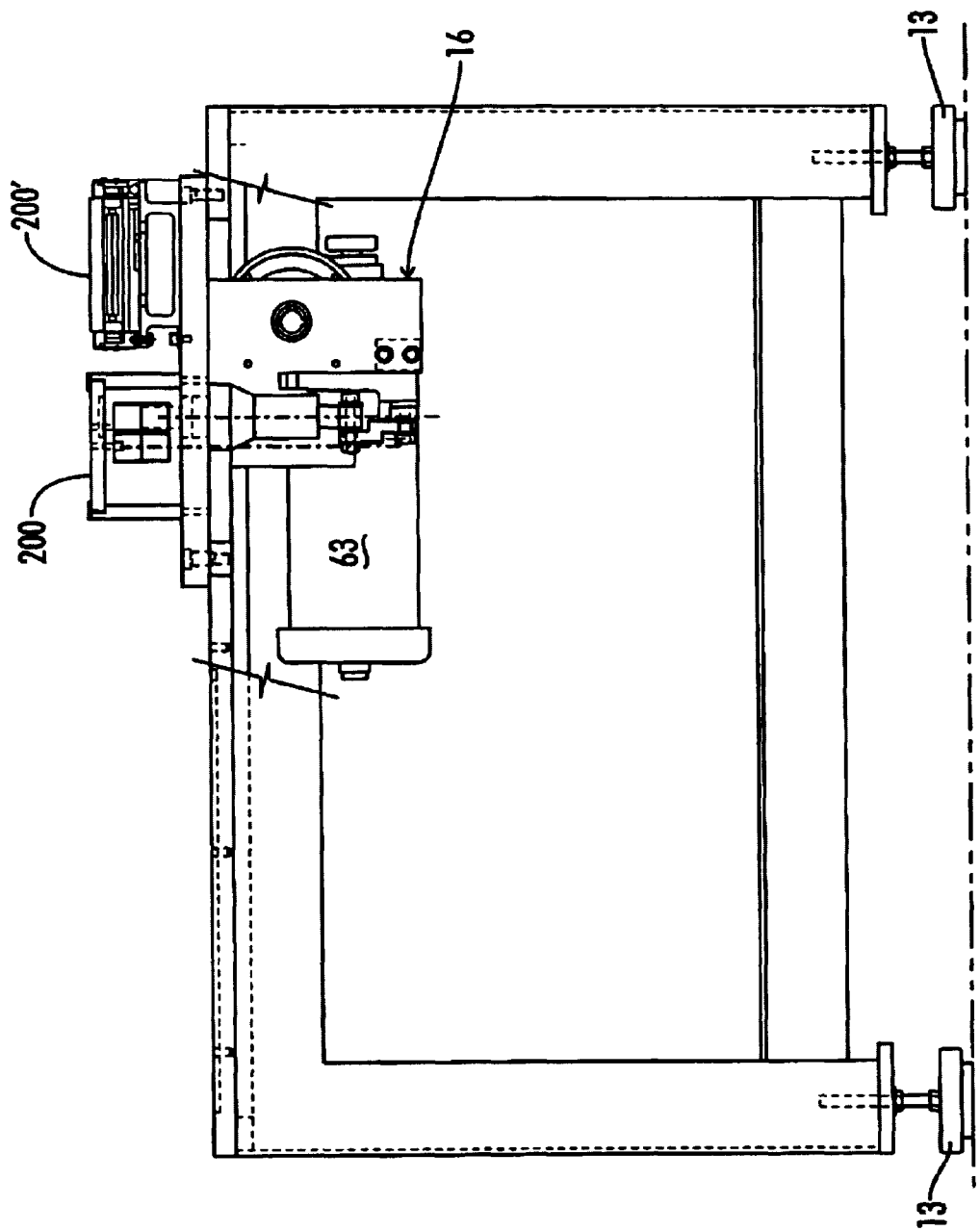
FIG. 4 is sectional view (section 4–4 from FIG. 2) of the modular pallet indexing chassis of the present invention.
Figure 5:
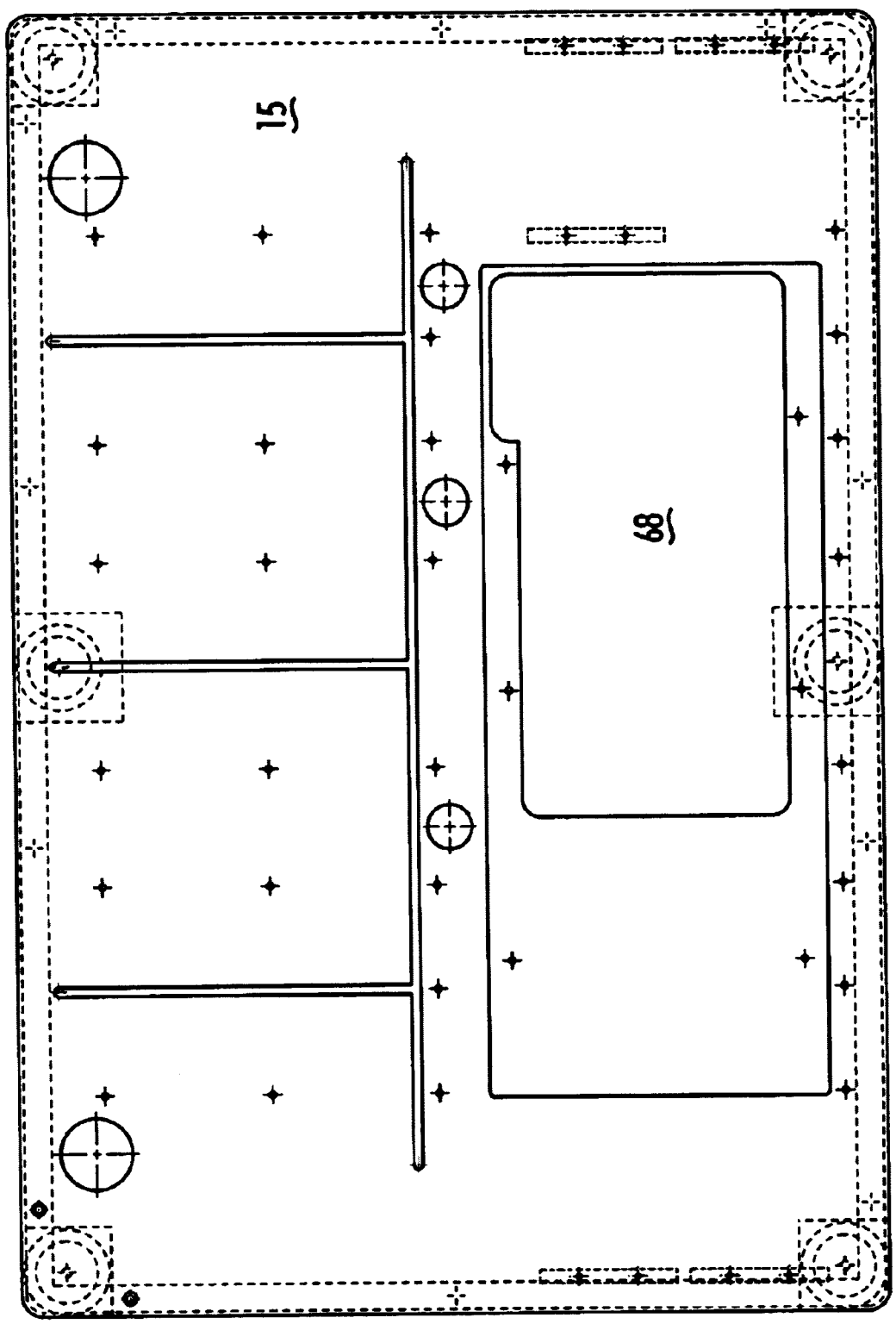
FIG. 5 is sectional view (section 5–5 from FIG. 2) of the modular pallet indexing chassis of the present invention.
Figure 7B:
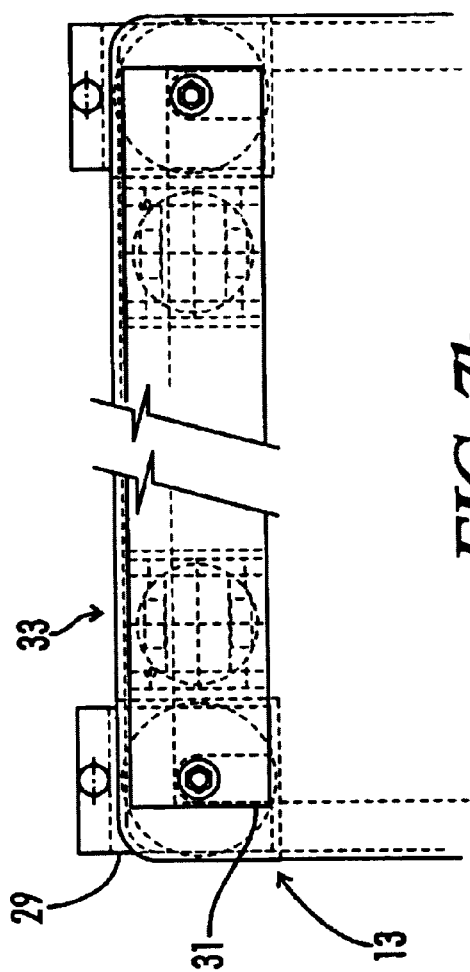
FIGS. 7a, b, and c are enlarged views of another embodiment of a portion (similar to 6c on FIG. 2) the modular pallet indexing chassis of the present invention, showing the use of swivel casters.
Figure 7C:
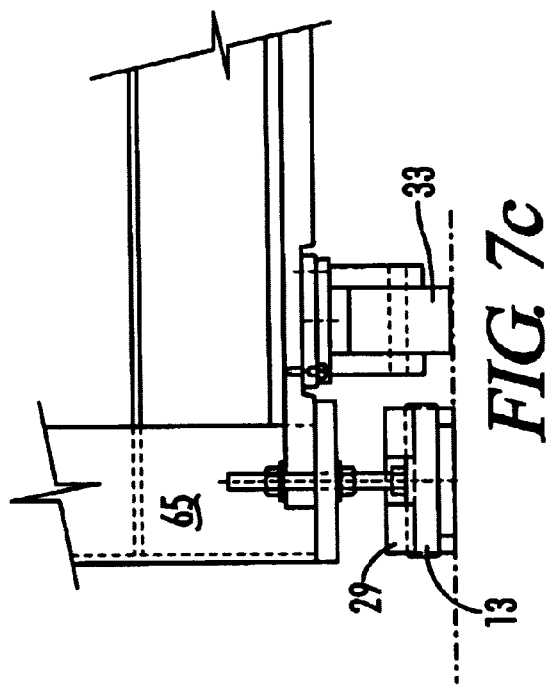
Figure 7A:
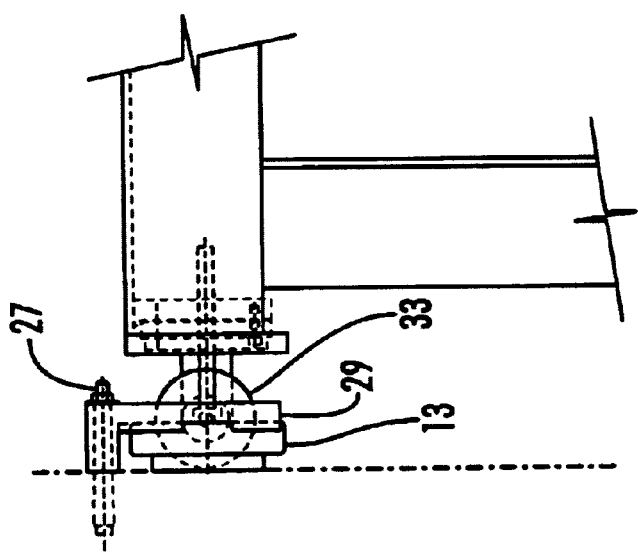
Figure 9:
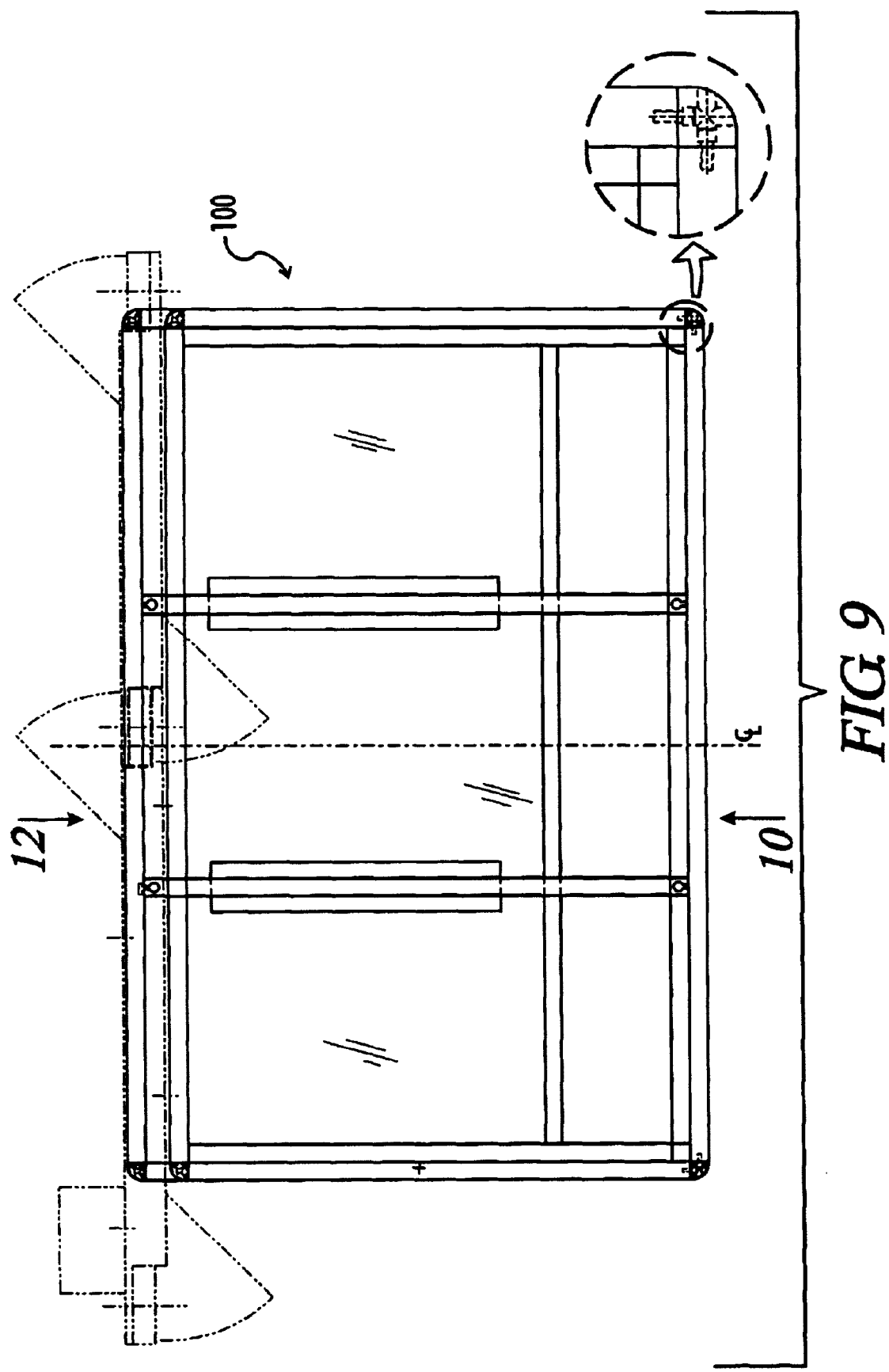
FIG. 9 is plan view of a chassis guard assembly that can be used with the modular pallet indexing chassis of the present invention.

Looking at FIGS. 1–4, the chassis 10 is constructed of a welded steel base 11 having a steel top plate 15. In the embodiment shown in FIGS. 1–8, the chassis 10 occupies a floor space of approximately 54"×82", with an overall height (including the chassis guard assembly 100 shown in FIGS. 14–16) of 86". The top plate 15, shown in detail in FIG. 5, is machined with a template opening 68 for through-mounting of a pallet transfer and indexing module 16 (FIG. 2) and mounting templates for standardized tool mounting of manufacturing devices such as industrial robots, part feeders, and the like.

Mounted to the top plate 15 on a support 41 (FIG. 8) is an incoming pallet conveyor 23. The incoming edge of the conveyor 23 extends over the incoming side 59 of the chassis 10 to receive incoming pallets 200 (FIGS. 3 and 4) from an adjacent upstream section (not shown) of a manufacturing process line. An outgoing pallet conveyor 14 is linearly aligned along the top plate 15 with the incoming pallet conveyor 23. The outgoing edge of the conveyor 14 extends over the outgoing side 58 of the chassis 10 so that it can convey outgoing pallets 200 (FIGS. 3 and 4) to an adjacent downstream section of the line (not shown). A pair of pallet return conveyors 12 and 21 are aligned near the operator side 60 of the chassis, and in parallel with the incoming and outgoing pallet conveyors 23 and 14, thereby forming a return conveyor path for pallets 200' (FIGS. 3 and 4) heading upstream in the process line. As shown in FIG. 8 with respect to conveyor 21, the return conveyors are supported above the top plate 15 by a support 42. A conventional proximity sensor 17 (FIG. 1) can be mounted on a sensor bracket 19 positioned below the outgoing end of conveyor 14 to provide a signal when the chassis is full, that is, when each incoming pallet 200 in the set has been positioned in a corresponding workstation 18a–f.

As shown in the embodiment of FIGS. 1–8, each of the pallet conveyors has a conventional open center, edge handling roller type configuration. The incoming conveyor 23 is 22 inches in length with the outgoing conveyor 14 having a 24-inch length. The pallet return conveyor path formed by return conveyors 12 and 21 have 60 inch and 22 inch lengths respectively. Conveyors of this design can be obtained from several sources including the MR Series supplied by Quickdraw Conveyor Systems in Hopkins, Minn.

Figure 1:
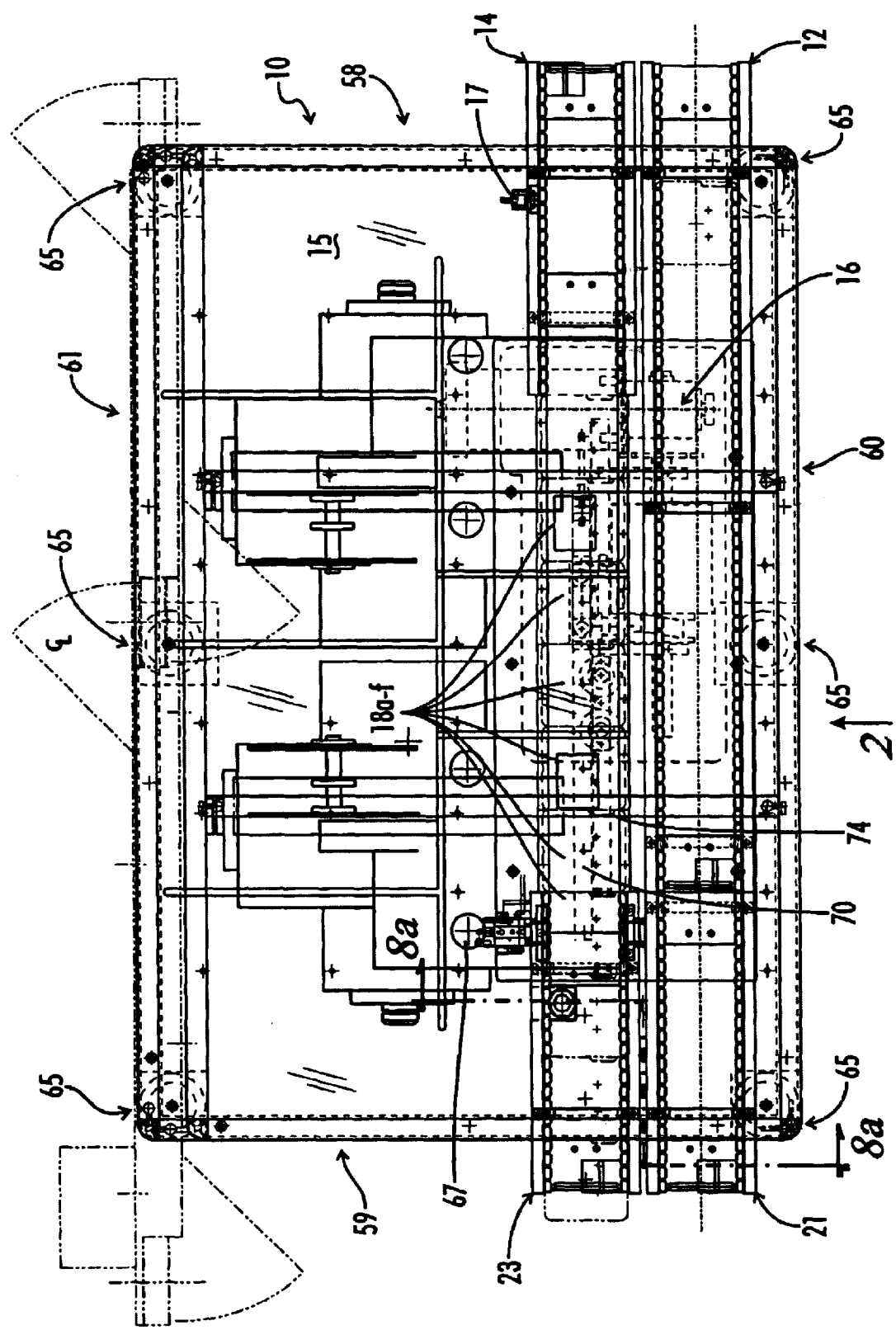
FIG. 1 is plan view of the modular pallet indexing chassis of the present invention.

As best seen on FIGS. 2, 4 and 8, a pallet transfer and indexing module 16 is mounted to and partially suspended below top plate 15. As is described in more detail below, the pallet transfer and indexing module 16 retrieves a set of incoming pallets 200 from the incoming conveyor 23 and accurately indexes or positions each pallet in a corresponding workstation 18a–f (FIG. 1). As shown on FIG. 1, the transfer and indexing module 16 is positioned between, and linearly aligned with, the incoming and outgoing pallet conveyors 23 and 14 so that outgoing pallets 200 (FIGS. 3 and 4) can be transferred to the outgoing conveyor 14 after the desired process steps are performed on the workpieces in the workstations 18a–f during the process cycle.

The back side 61 of the chassis 10 is preferably kept open so that parts used in certain manufacturing processes can be easily moved onto the chassis 10.

Figure 2:
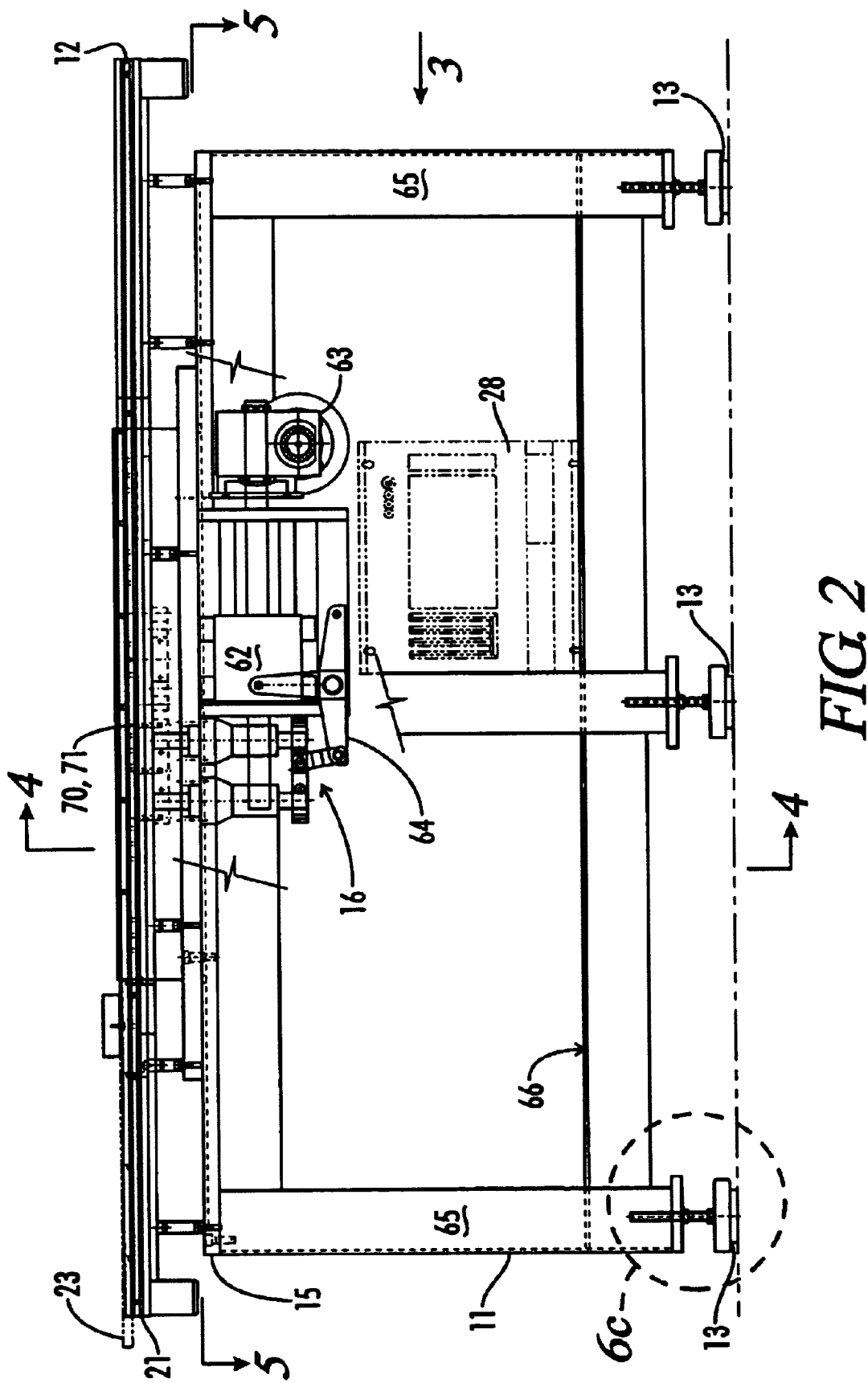
FIG. 2 is a side view (view 2 from FIG. 1) of the modular pallet indexing chassis of the present invention.

FIG. 2. shows the chassis base 11 supported by six vertical legs 65. Each leg 65, in turn, preferably contacts the floor through a conventional anti-vibration mount 13. As seen on FIGS. 6a–c, hold down brackets 29 and sleeved bolts 27 can be used in combination with the anti-vibration mounts 13 to firmly secure the chassis 10 to the floor. If the process line is such that easy removal and reconfiguration of a chassis 10 is needed, swivel casters 33 and respective caster mounting plates 31 (FIGS. 7a–c) can be added to the base 11 adjacent each mount 13. A chassis lower plate 66 supports power and control sub-systems (examples 30a, b and 32 shown in FIG. 14) that are needed to provide power and operational control to the various manufacturing devices that are attachable to the pre-configured top plate. In addition, a conventional programmable industrial control computer 28 (including a motor control card 57) is preferably mounted here to provide basic control for the chassis 10 and/or manufacturing devices that require it.

In one embodiment of the chassis 10, the industrial control computer 28 can be a conventional windows-based personal computer running application software that allows a user of the chassis to write and modify program code that defines the operation of the chassis and integration of attached manufacturing devices. The industrial control computer 28, the attached devices, and any separate device control units (as shown in FIGS. 14–16) are linked using standardized DeviceNet and Ethernet automation and network communication protocols. Preferably, the application software allows a chassis user to program automation routines that are specific to a particular manufacturing process in a visual programming environment. Steeplechase Visual Logic Controller software from Entivity, Inc., in Ann Arbor, Mich., is one example of such software that can be used to control operations of the chassis 10.

An end view of the outgoing side 58 of the chassis 10 is shown in FIG. 3, with an incoming pallet 200 and return pallet 200' positioned within their respective outgoing conveyor 14 and return conveyor 21. Pre-stage mechanism 67 operates in conjunction with the pallet transfer and indexing module 16 to pre-position each incoming pallet 200 for transfer and indexing to the correct workstation 18a–f. One or more openings in side panel 25 allow for installation of a vacuum header 38 and pneumatic header 40 so that the chassis 10 (and attached manufacturing devices that require vacuum or pneumatic power) can be quickly and easily coupled to appropriate air and vacuum power sources. Preferably, the chassis is equipped with a conventional vacuum generator which can generate vacuum from using an external air source.

The structure and operation of the pre-stage mechanism 67 and pallet transfer and indexing module 16 can now be described with particular reference to FIGS. 1, 2 and 8(a)–(c). The embodiment of the chassis 10 as illustrated in FIGS. 1–8 is designed to operate with a specific pallet such as a 6"×641 Delrin or Nylon pallet available from Stelron Components, Inc. of Mahwah, N.J. Fixturing on the pallet 200 holds workpieces (not shown) for assembly or other manufacturing process steps. When an incoming pallet 200 is moved inward on non-synchronous incoming pallet conveyor 23, it approaches the pre-stage mechanism 67. The function of pre-stage mechanism 67 is to move the incoming pallets 200 slightly outward within the incoming conveyor 23 to pre-position the pallets 200 for the transfer and indexing operation. The pre-stage mechanism 67 includes a position sensor assembly 69 (FIG. 8(b)) which preferably includes an optical position sensor 51 (such as the IA1.53SMTA fiber-optic sensor from Banner Engineering Corp., Minneapolis, Minn.). The sensor 51 is mounted to sensor plate 50 that is held in a position by sensor bracket 49. The pre-stage mechanism 67 is mounted above the top plate 15 and proximate the inner rail of incoming conveyor 23 on a riser 45. A cam follower mechanism 47 operates in conjunction with a conventional air slide table 48 (such as the MXS12-30-A-F9P-L-X12 from SMC Corporation of America, Indianapolis, Ind.). The locate rail 52 includes a bearing 71 that engages a recessed area 72 in the side of the pallet 200. This locates the center of the pallet 200 before the pre-stage mechanism presses it laterally inward on the conveyor 23. As the pallet 200 moves horizontally inward on the conveyor 23, it is engaged by a pawl catch 56 (FIG. 8(c)) that is mounted on a spacer 39 (FIG. 8(a)) and positioned underneath the conveyor 23. This prevents the pallet 200 from rebounding out of position when it reaches the stop point on the conveyor 23. This begins the pallet transfer cycle. The air slide table 48 and locator bar 52 move pallet 200 laterally outward until it engages a pair of bearings 73 located in a datum rail 54 positioned laterally inward from the conveyor 23 wall by spacer 53. The sensor 51 detects when the pallet 200 is in the correct position by sensing movement of the air table 48 and sends a corresponding signal to the industrial control computer 28. The industrial control computer 28 is programmed to receive this "pallet in position" signal and then communicate with the pallet transfer and indexing module 16 to allow the transfer cycle to continue.

Referring now to FIGS. 1 and 2, the pallet transfer and indexing module 16 has a DC motor 63 that rotates a cam box 62 that moves an arm 64 and transfer bar 70 that is positioned underneath the pallet. The transfer bar 70 is moved in a rectangular motion up, forward, down, and back. Vertical pins in the transfer bar 70 engage holes in the bottom surface of the pallet to locate the pallet and move it forward to precisely position it in one of the six workstations 18a–f (FIG. 1). A synchronized locking pin bar 74 is aligned in parallel with and adjacent the transfer bar 70. The locking pin bar 74 is also driven by cam box 62 and moves up as the transfer bar 70 moves down, using vertical pins to hold and locate the pallets 200 (in sets of six at a time in the embodiment of FIGS. 1–8) while the transfer bar 70 returns to engage a pallet for another transfer. Preferably, the indexing mechanism as described uses a cam box 62 that drives transfer bar 70 with a modified sine wave function to provide improved operational speeds.

The pallet transfer and indexing module 16 can be a conventional recirculating walking beam assembly, such as a Model RWB-100C-INLM in-line transfer module from Stelron Components, Inc. of Mahwah, N.J. A recirculating walking beam assembly is built on a synchronous, linear cam-actuated base. The pallets are moved in a linear pattern by a synchronized, cam-actuated walking beam. The walking beam engages each pallet with dowel pins or other simple mechanism and the pallets are transferred in tool steel guideways. The walking beam indexes the pallets one at a time. Before the walking beam disengages, a mechanically synchronized locking bar engages each pallet with two low clearance shot pins to maintain high position accuracy.

After each transfer cycle, the pallets 200 are positioned in a workstation 18a–f and are ready for assembly or manufacturing operations during the process cycle. The dwell for the process cycle can be programmed to be as long as required by that specific process or operation. The cam box 62 is stopped at the end of each transfer cycle to allow for this single-stroking operation. After the process steps are completed for the sixth or last pallet, the pallet 200 is transferred forward to outgoing conveyor 14 which delivers it to the outgoing side 58 of the chassis 10 to the next operation or to a shuttle (not shown) that moves the pallet 200 to the return conveyor 12. The return conveyors 12 and 21 transport the pallet to the beginning of the process line or to another chassis 10 for additional production.

A conventional passive RF read/write identification system can be used with the chassis 10, as shown in FIG. 8. A passive read/write tag 37 is attached to an incoming pallet 200 or workpiece (not shown). As the pallet moves across the chassis 10, a reader 35 (with a remote antenna and mounted on bracket 43) reads the tag 37 and signals a remote receiver. Such systems are available from Escort Memory Systems of Scotts Valley, Calif.

Figure 10:
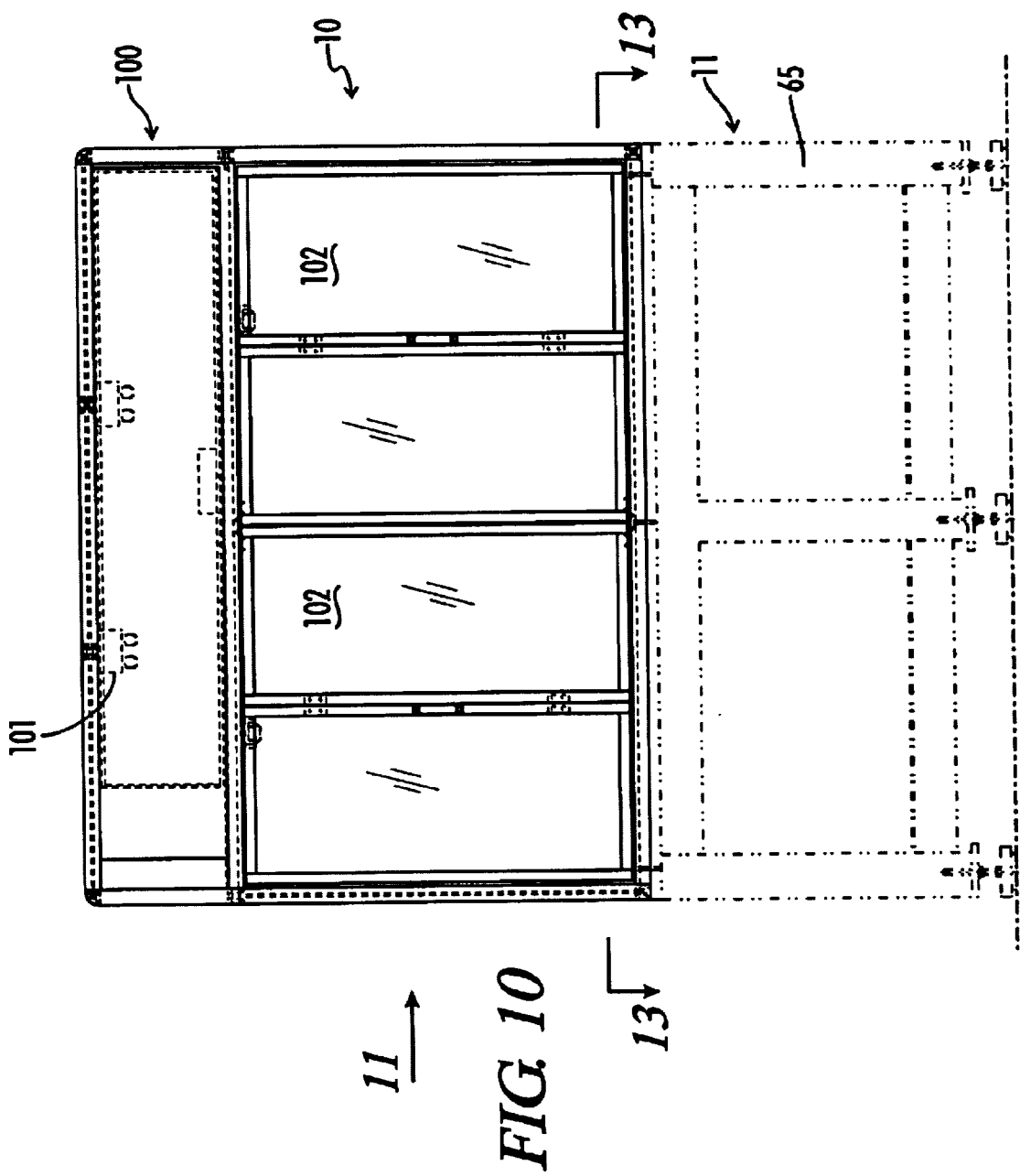
FIG. 10 is a side view (view 10 from FIG. 9) of the chassis guard assembly.
Figure 11:
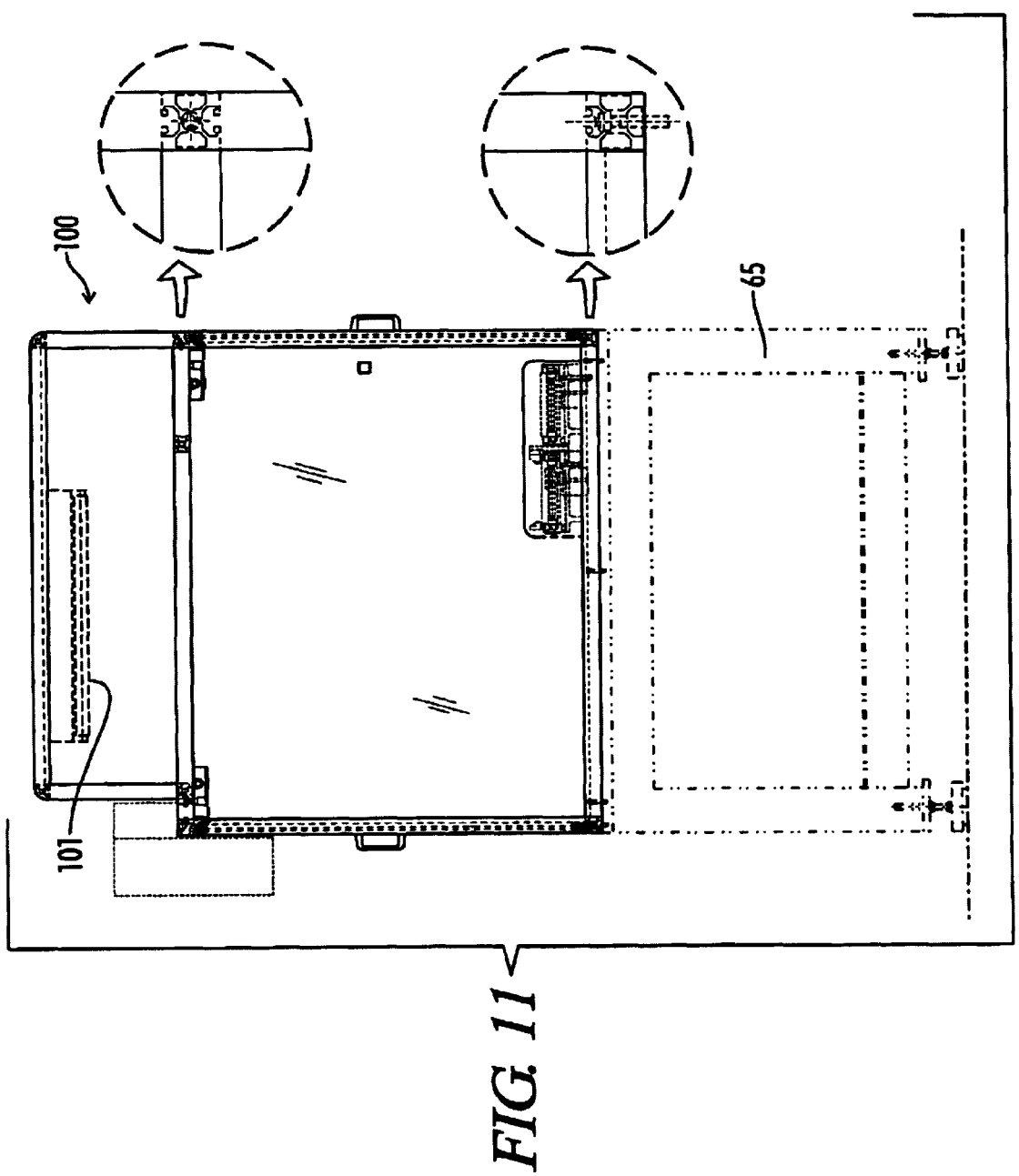
FIG. 11 is an end view (view 11 from FIG. 10) of the chassis guard assembly.
Figure 12:
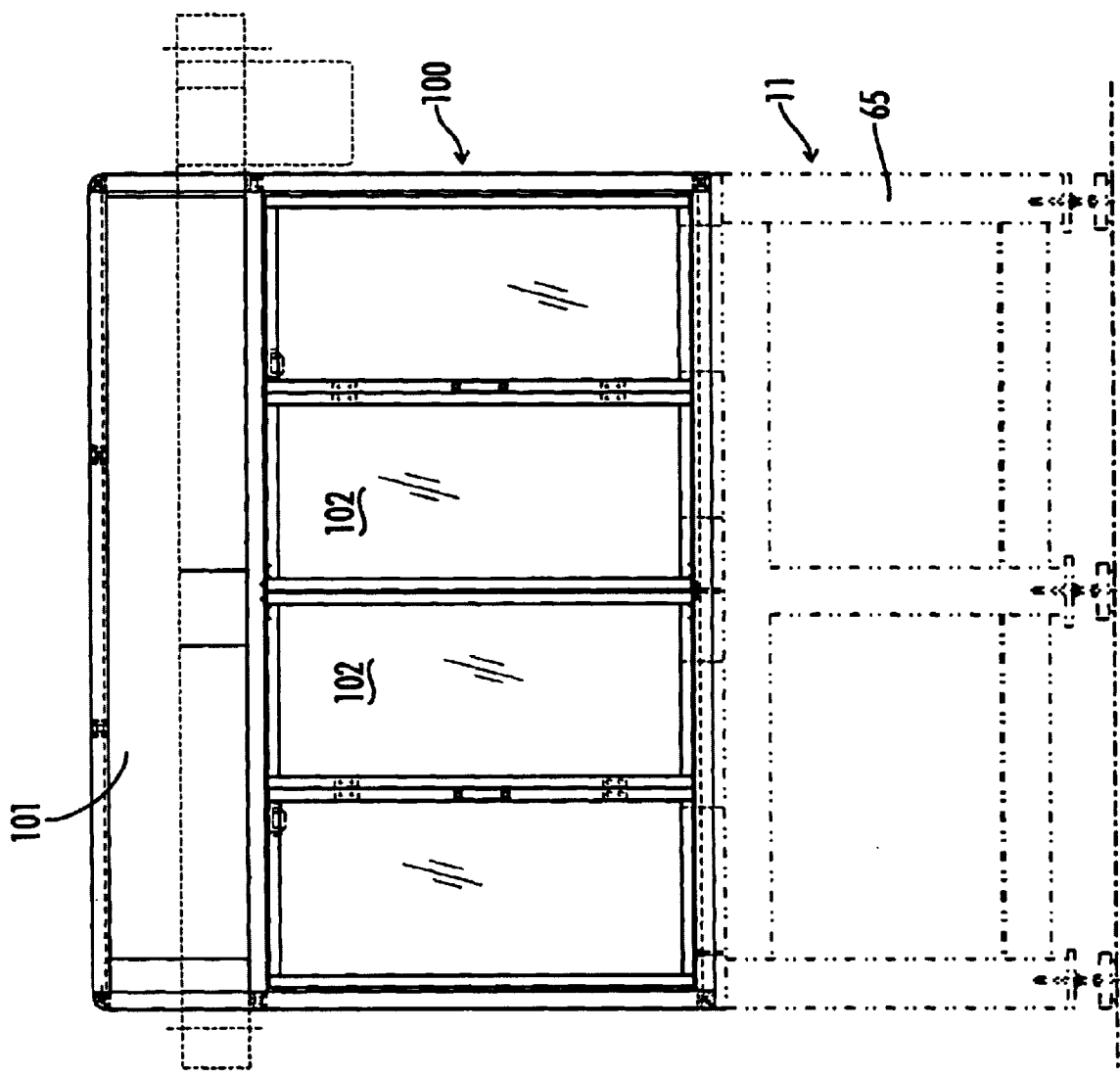
FIG. 12 is a side view (view 12 from FIG. 9) of the chassis guard assembly.
Figure 13:
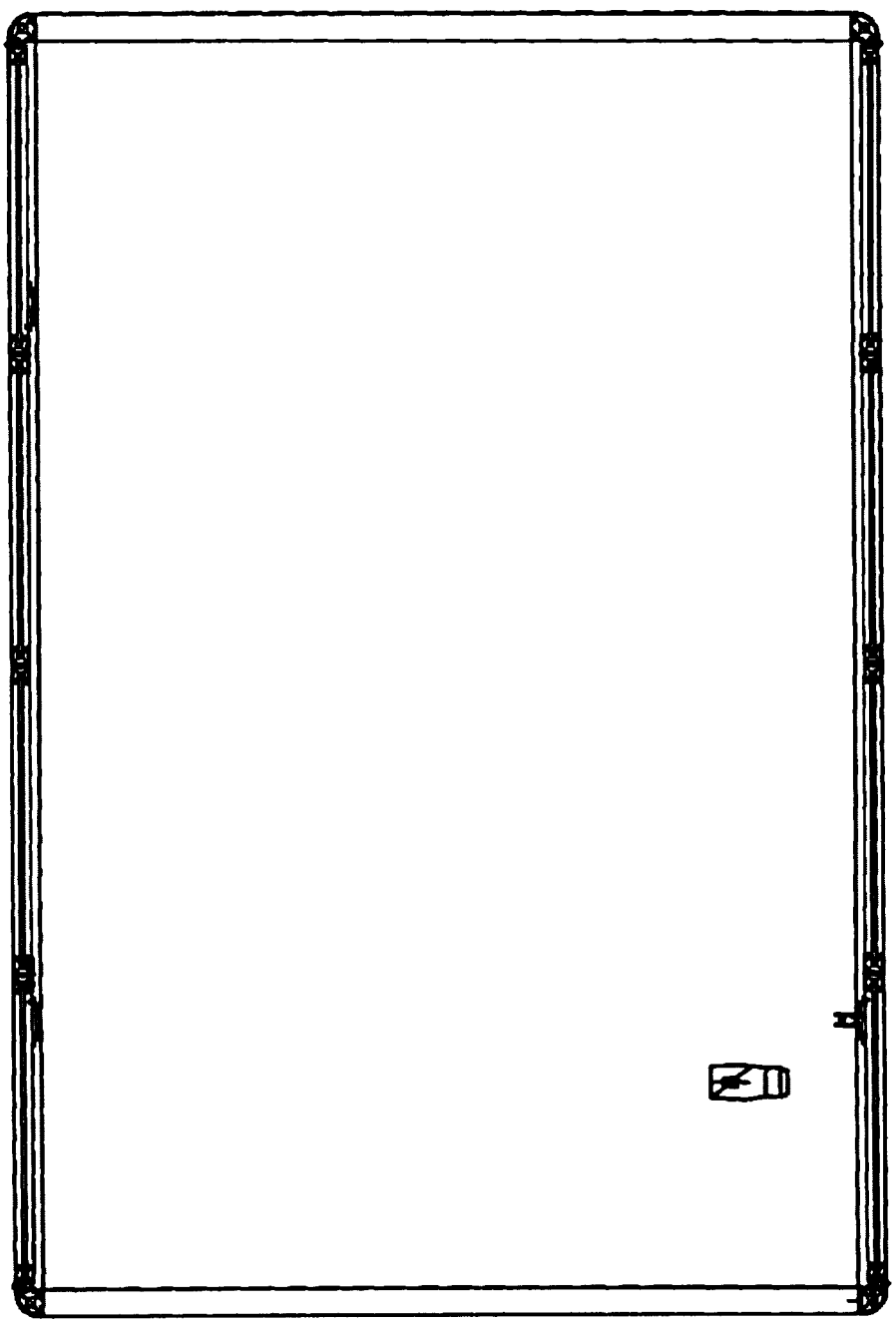
FIG. 13 is a sectional view (section 13–13 from FIG. 10) of the chassis guard assembly.

FIGS. 14–16 show the chassis 10 fully equipped and positioned for use in a manufacturing process line. A pair of industrial robots 201a and 201b have been mounted to the chassis top plate 15. Corresponding robot controllers 30a and b are mounted on the lower plate 66, along with the industrial control computer 28 and an electrical power disconnect 32. The exposed moving components on the chassis 10 are protected by a chassis guard assembly 100 that is shown in more detail in FIGS. 9–13. A touch screen operator panel 20 can be mounted to the chassis guard assembly 100 and connected to the industrial control computer 28, robot controllers 30a and b, and/or to an overall process control system (not shown) through wire way 36 (FIG. 16). Visual automation programming can be performed on the panel 20 using keyboard and other commands. A local control panel 24 can also be used to provide separate, local control of the chassis 10. The local control panel 24 can include power distribution and circuit breaker panels, as needed. Machine power is delivered to the chassis 10 through high current bus duct 34. An activity beacon 26 lights up when the chassis 10 is active. The chassis guard assembly 100 can include interior strip lights 101 and a pair of Lexan front access doors 102 (FIG. 10). Accordingly, machine control components are strategically located inside the base 11, and above base 11 on the control panel 20. This provides ease of access via the upper control panel 20, and simple wiring and plumbing with lower components. Assembly components are normally fed from the rear 61 of the chassis 10 allowing easy access to the operator side 60.

Thus, although there have been described particular embodiments of the present invention of a new and useful Modular Pallet Indexing Chassis for Product Manufacturing and Assembly Operations, it is not intended that such references be construed as limitations upon the scope of this invention except as set forth in the following claims.

What is claimed is:

1. A chassis for use in a manufacturing process line wherein manufacturing process steps are performed by manufacturing devices on workpieces carried by pallets, the chassis comprising:
   a. a base including a horizontal top plate, the top plate pre-configured for mechanically attaching one or more of the manufacturing devices to the chassis;
   b. an incoming pallet conveyor aligned horizontally on the top plate to receive a set of incoming pallets from an incoming side of the chassis;
   c. a pallet transfer and index module attached to the chassis proximate the incoming pallet conveyor and aligned to accept the set of incoming pallets from the incoming pallet conveyor, the transfer and index module including an indexing mechanism to accurately position each of the retrieved incoming pallets in the set in one of a plurality of workstations during a transfer cycle so that at the end of the transfer cycle the process steps can be performed on each of the workpieces supported by each of the plurality of pallets in the set during a process cycle;
   d. an outgoing pallet conveyor aligned horizontally on the top plate to receive the set of pallets from the pallet transfer and index device and move the set of pallets to an outgoing side of the chassis at the end of the process cycle; and
   e. a pallet return conveyor aligned on the top plate parallel to the incoming and outgoing pallet conveyors proximate an operator side of the chassis, the return conveyor positioned to receive pallets from the outgoing side and move them to the incoming side.

2. The chassis of claim 1 further comprising at least one power and control sub-system attached to the chassis for providing operational power to and control of one or more of the manufacturing devices that are attachable to the chassis.

3. The chassis of claim 2 further comprising a process control panel attached to the chassis so that it is viewable from the operator side of the chassis, the process control panel operatively coupled to the power and control sub-system.

4. The chassis of claim 3 wherein the top plate includes mounting holes for mechanically attaching both robot and parts feeder manufacturing devices, and the power and control sub-system includes means for providing and connecting both electrical and pneumatic power to the manufacturing devices.

5. The chassis of claim 4 wherein the power and control sub-system further comprises a computer that is programmable to implement at least some of the process steps through one of the manufacturing devices attachable to the chassis.

6. A chassis for use in a manufacturing process line wherein manufacturing process steps are performed by manufacturing devices on workpieces carried by pallets, the chassis comprising:
   a. a base including a horizontal top plate, the top plate pre-configured for mechanically attaching one or more of the manufacturing devices to the chassis;
   b. an incoming pallet conveyor aligned horizontally on the top plate to receive a set of incoming pallets from an incoming side of the chassis;
   c. a pallet transfer and index module attached to the chassis proximate the incoming pallet conveyor and aligned to accept the set of incoming pallets from the incoming pallet conveyor, the transfer and index module including an indexing mechanism to accurately position each of the retrieved incoming pallets in the set in one of a plurality of workstations during a transfer cycle so that at the end of the transfer cycle the process steps can be performed on each of the workpieces supported by each of the plurality of pallets in the set during a process cycle;

d. an outgoing pallet conveyor aligned horizontally on the top plate to receive the set of pallets from the pallet transfer and index device and move the set of pallets to an outgoing side of the chassis at the end of the process cycle; and e. wherein the workstations are aligned horizontally and in-line with the incoming and outgoing conveyors and the indexing mechanism includes a cam box driven by a cam motor, the cam box mechanically coupled to drive a transfer bar in a substantially rectangular motion, the transfer bar having locator pins positioned to align with and engage each pallet in the incoming set so that during the transfer cycle, the transfer bar can move each pallet linearly forward a pre-determined distance to one of the workstations.

7. The chassis of claim 6, the indexing mechanism further comprising a locking pin bar mechanically coupled to the cam box to engage and hold the incoming pallets in their respective workstations while the transfer bar moves to engage and transfer another incoming pallet until each workstation is occupied by a pallet and its corresponding workpiece.

8. The chassis of claim 7 further comprising a programmable industrial control computer and at least one sensor positioned to monitor the positions of incoming pallets, the sensor operatively linked for communication with the industrial control computer.

9. The chassis of claim 8 wherein the cam box generates a modified sine wave transfer curve.

10. The chassis of claim 8 further comprising a vacuum header to connect the chassis and to a vacuum source, a pneumatic header to connect the chassis to an air source, a high current electrical bus duct, and a low current and communications wire way.

11. The chassis of claim 8 further comprising a chassis guard attached to chassis to shield an operator from the manufacturing devices and transfer and indexing module during the transfer and process cycles.

12. A chassis for use in a manufacturing process line wherein manufacturing process steps are performed by manufacturing devices on workpieces carried by pallets, the chassis comprising:

a. a base including a horizontal top plate, the top plate pre-configured for mechanically attaching one or more of the manufacturing devices to the chassis;

b. an incoming pallet conveyor aligned horizontally on the top plate to receive a set of incoming pallets from an incoming side of the chassis;

c. a pallet transfer and index module attached to the chassis proximate the incoming pallet conveyor and aligned to accept the set of incoming pallets from the incoming pallet conveyor, the transfer and index module including an indexing mechanism to accurately position each of the retrieved incoming pallets in the set in one of a plurality of workstations during a transfer cycle so that at the end of the transfer cycle the process steps can be performed on each of the workpieces supported by each of the plurality of pallets in the set during a process cycle;

d. an outgoing pallet conveyor aligned horizontally on the top plate to receive the set of pallets from the pallet transfer and index device and move the set of pallets to an outgoing side of the chassis at the end of the process cycle; and e. a pre-stage mechanism mounted on the top plate adjacent the incoming conveyor and operable to move each incoming pallet in the set laterally to preposition it for handling by the transfer and indexing module.

* * * * *